United States Patent [19]  [11] 4,041,195
Dussaussoy  [45] Aug. 9, 1977

[54] MANUFACTURING PROCESS OF POROUS TUBULAR MEMBERS

[75] Inventor: Pierre Dussaussoy, Pantin, France

[73] Assignee: Commissariat a l'Energie Atomique, Paris, France

[21] Appl. No.: 224,638

[22] Filed: Feb. 8, 1972

[30] Foreign Application Priority Data

Feb. 16, 1971   France ................... 71.05158

[51] Int. Cl.² .................................. B05C 7/14
[52] U.S. Cl. ........................... 264/60; 264/112; 428/36; 55/503
[58] Field of Search ............ 75/208, 222, 214; 29/182.2; 117/99, 100; 427/244, 245

[56] References Cited

U.S. PATENT DOCUMENTS

| | | | |
|---|---|---|---|
| 2,390,160 | 12/1945 | Marvin | 75/208 R X |
| 3,087,879 | 4/1963 | Walker et al. | 75/208 R UX |
| 3,109,797 | 11/1963 | Maxwell | 75/208 CS X |

Primary Examiner—Stephen J. Lechert, Jr.
Attorney, Agent, or Firm—Cameron, Kerkam, Sutton, Stowell & Stowell

[57] ABSTRACT

The manufacturing process of porous tubular members constituted by two coaxial layers comprises transferring of a layer intended to become the internal layer and being previously applied over a rigid core inside a tubular rough shape which is intended to constitute an external layer by compression of the rough shape over the core supporting the internal layer.

7 Claims, No Drawings

MANUFACTURING PROCESS OF POROUS TUBULAR MEMBERS

The present invention relates to the manufacturing process of porous tubular members and more particularly of members constituted by at least two coaxial layers of different texture. The essential object of the invention is to achieve the manufacturing process of these members and the members obtained by this process.

In fact, it is known that members are often used in example as filters or as catalytic holders obtained by forming a mineral agglomerated powder with an organic binder and after burning at adequate temperature for elimination of the binder and to perform the cohesion and the mechanical strength by sintering. It is the case of usual techniques of powder metallurgy and ceramic industries.

Such a tube, presenting a fairly texture in its overall thickness, does not allow simultaneously all the mechanical strength, permeability and filtering efficiency as required for the members.

The realisation of members with small thickness being prohibited because of mechanical strength arguments, the most generally used powders are of strong grain size, in view to obtain high permeability allowing a maximum flow and small loss of charge for fluids passing inward the member.

On the other hand, by fastening of very small particles in a filter or to form a suitable holder with catalytic layers or micro-porous layers, it is of importance that members have a not very rough surfacce, a fine texture with a small middle radius of pores.

In view to gain these opposite requirements it is well known that to make use of members constituted by two coaxial layers a thick layer with a rough texture, presenting pores with a large radius, which gives the necessaary mechanical strength with a high permeability, and a thin layer with a fine texture presenting a small radius of pores with a small permeability. This second layer which requires its own output is as thin as possible in order to avoid a strong reduction of the total permeability.

By a standard process, these members with two coaxial layers are manufactured by parallel extrusion from two different mineral pastes agglomerated with an organic binder : these two pastes are concentrically placed in a cylinder of an extruding press and are extruded together by compression through an annular pipe.

This process presents some difficulties for the members finally obtained after the thermal treatment of sintering. More particularly, the thin layer with fine texture has not a strictly constant thickness and the member often presents some important heterogeneousness of permeability. Consequently of this lack of precision and dimensional drift which may occur during the process the minimal thickness of the thin layer is still too much important.

In view to avoid such difficulties, the present invention proposes a manufacturing process for tubular porous members constituted by two coaxial layers which is achieved by transferring of a layer which is intended to become the internal layer and being previously applied over a rigid core inside a tubular rough shape intended to constitute an external layer by compression of said rough shape over said core supporting said internal layer.

According to a preferred embodiment of the invention, the process allowing the manufacture of porous tubular members constituted by two coaxial layers of different textures from different grain size powders, is achieved by realisation of said tubular rough shape in powder of rough texture agglomerated with an organic binder, the realisation of a thin layer with fine texture over said rigid core with an external diameter smaller than the internal diameter of said tubular rough shape, placing of the said core so coated inside said tubular rough shape, the isostatic compression of said rough shape to process a radial drift of the said core, and after removing of the pressure, said thin layer being carried by said tubular rough shape which radially slacken, the separation of said rigid core and burning of the suit.

According to an other embodiment of the invention, said tubular rough shape is realized by mixing of a mineral powder, in example ceramic oxide, an organic binder and a diluent, form setting of the paste obtained and drying to induce partial evaporation of said diluent up to a favourable diluent rate residue of less than 10% (in weight).

Compression of the rough shape is performed preferably under isostatic pressure comprised between 500 and 2000 bars.

The realization of the thin layer over the rigid core may be produced by any one known technique. More particularly it is possible to realize a suspension of a mineral powder with grain size different from that of the external layer in an organic binder and/or a diluent and in soaking the rigid core in this suspension or in coating it with spraying said suspension over the rigid core with a pneumatic gun or by electrostatic spraying.

In order to place the rough shape easily around the rigid core coated with its layer it is better to allow a minimal clearance of about 5% between the external diameter of the rigid core coated with the thin layer and the internal diameter of the tubular rough shape. According to the composition of the rough shape and to its residual humidity (humidity rate when the diluent is water or more generally speaking, diluent rate), the clearance may reach values ranging about 7%, without crumpling or destroying of the rough shape during compression. Such a relatively important clearance make easier in other respects, placing of the rigid core in the tubular rough shape : the clearance allows sliding of the rough shape over the rigid core coated with the thin layer without any risk to damage this latter.

During the isostatic compression it arises a radial shrinking of the tubular rough shape placed over the thin layer. After removing of the pressure, the thin layer with fine texture sticks to the tubular rough shape and consequently moves aside of the rigid core due to the swell of the rough shape. This swell depending upon the residual humidity rate, can reach values of 0.5%. The swell allows further shrinking of the rigid core. The burning of the tubular rough shape internally coated with thin layer is further realized according to the usual techniques in order to eliminate the organic materials from the rough shape (essentially the diluent) and to ensure the mechanical strength by sintering of the mineral powder.

In addition of the advantages concerning manufacturing facilities, the process in accordance with the invention allows some improvements in the properties of the porous member finally obtained and more particularly improvements of its mechanical characteristics. Likewise, the process allows to obtain members in which the internal thin layer with fine texture is very regular with a constant thickness which may be extremely weak.

An other important objective of the invention is to allow the realization of porous tubular members with a non-polished internal surface. The thin layer may have a fixed artificial roughness : the patterns are then sunk carved or in relief on the rigid core and the duplicate of these patterns comes together again over the internal face of the rough shape after isostatic compression. The maximum depth of the reliefs is fixed as a dependent variable of the swell size during the expansion, to allow the shrinking of the rigid core. Likewise, the process does not apply only for realisation of cylindrical members, but more generally it is applied to all tubular form selected in connection with the stripping possibilities after compression by shrinking of the rigid core.

One other setting example of the process is hereinafter described in accordance with the invention applied to the realization of a porous member in alumina formed with two cylindrical coaxial layers, one internal thin layer with a fine texture and one external thick layer with a rough texture.

Over a cylindrical core in chromium plated steel, it is pulverized a suspension of alumina the grain size of which is comprised between 2 and 6 microns in a solution of water and ethylic alcohol together with an organic binder as a cellulose ester. The binder is in proportion of 4 to 8% with regard to the alumina powder.

The metallic core is driven into rotation and the pulverization is induced with pneumatic gun longitudinally displaced in front of the core. Thus a fine texture layer of 0.5 mm thickness is realized over a rigid core of 14.8 mm diameter.

Moreover a paste is obtained by mixing an alumina powder the grain size of which is comprised between 37 and 70 microns with 6% of a cellulose organic binder and 18% of water as diluent. This paste is further compressed under 200 bars, in the form of a cylindrical cake. This cake is introduced in an extruding press with an annular pipe and the cake is extruded in the form of a cylindrical tubular rough shape at a pressure of 250 bars. The formed rough shape is partially dried until an amount of 2% of the residual humidity rate.

This rough shape is intended to form the thick layer with rough texture. Its thickness is 2 mm with internal diameter something greater than that of the metallic core coated with the thin layer.

This rough shape is slipped over the thin layer. The relative dimensions between the rough shape ( internal diameter) and the core coated with the thin layer (external diameter) provide a clearance of about 0.7 mm. The suit is then placed in a distorted tight membrane in plastic material and compressed under 1500 bars. After compression the membrane is removed and the metallic core is drawn out without difficulty.

After burning of the suit at 1850° C, a porous tubular member presenting a good mechanical strength is obtained. Such member is able to support an isostatic compression of 1500 bars without loosening or decohesion of the internal layer.

While there has been described what is at present considered to be the preferred embodiment of the invention, it will be understood that various modifications may be made therein, and it is intended to cover in the appended claims all such modifications as fall within the true spirit and scope of the invention.

What I claim is:

1. Process for making porous tubular elements having two superposed coaxial layers, an external layer of rough texture and of high mechanical strength, and an internal layer of small radial thickness and fine texture, the steps of preparing a tubular shape of rough texture agglomerated by an organic binder, forming a thin layer of fine texture on a rigid core having a smaller external diameter than the internal diameter of the tubular shape, isostatically compressing the tubular shape for radial compression of the shape onto the rigid core, releasing the isostatic compression on the resulting assembly with radial expansion of the tubular shape and of the thin layer adhered thereto away from the rigid core, withdrawing the rigid core from the assembled tubular shape and thin layer and then baking the assembly.

2. Process for the manufacture of porous tubular elements as described in claim 1, including the steps of roughening the surface of the rigid core and covering the rough surface with the thin layer of fine texture.

3. Process according to claim 1 including the steps of forming said rough shape by mixing of a ceramic oxide, an organic binder and a diluent, form setting the resulting paste and drying to partial evaporation of said diluent 4. Process according to claim 3, said tubular rough shape being dried to a relative rate of diluent lower than 10% in weight.

5. Process according to claim 1, the compression of said rough shape being at an isostatic pressure between 500 and 2000 bars.

6. Process according to claim 1, the difference between the external diameter of said rigid core and the internal diameter of said tubular rough shape being about 5 to 7%.

7. Process according to claim 1, the thin layer being spray deposited over said rigid core from a lineral powder.

* * * * *